UNITED STATES PATENT OFFICE 2,150,039

PREPARATION OF ORGANIC COMPOUNDS

Norman D. Scott, Sanborn, and Joseph Frederic Walker, Niagara Falls, N. Y., assignors to E. I. du Pont de Nemours & Company, Wilmington, Del., a corporation of Delaware No Drawing. Application April 12, 1937, Serial No. 136,434

14 Claims. (Cl. 260—671)

This invention relates to the preparation of organic compounds, and more particularly to processes comprising reacting the alkali metal addition compounds of polycyclic aromatic hydrocarbons with organic halogen compounds.

As more fully explained below, it has been found heretofore that polycyclic aromatic hydrocarbons such as naphthalene, diphenyl, phenanthrene and the like, when dissolved in certain ether or amine solvents, readily react with sodium or other alkali metals to form colored solutions of alkali metal addition compounds. These colored solutions are highly reactive and, for example, readily react with compounds having replaceable hydrogen atoms to form the corresponding dihydro compounds of the polycyclic aromatic hydrocarbons, e. g. dihydronaphthalene is formed from the sodium-naphthalene compound, and the alkali metal substitution product of the reagent used.

An object of the present invention is to utilize the above mentioned colored solutions of alkali metal addition compounds of polycyclic aromatic hydrocarbons for the preparation of various organic compounds and various resin-like liquid and solid polymeric organic substances by reacting said colored solutions with organic halogen compounds. A further object is to provide an improved method for preparing alkylated derivatives of polycyclic, aromatic and aralkyl hydrocarbons. Another object is the preparation of dibenzyl, halogenated dibenzyls, and similar symmetrical aralkyl compounds. Still another object is the preparation of terpene-like compounds consisting of methylene and polymethylene derivatives of polycyclic aromatic hydrocarbons, for example, methylene naphthalene and trimethylene naphthalene. Other objects will be apparent from the following description of the invention.

The above objects are obtained in accordance with the present invention by reacting the aforesaid colored solutions with various halogenated organic compounds. By this means a great variety of products may be obtained, the nature of the product in each instance depending upon the nature of the halogenated compound reacted, as shown by the following description. We have found that different types of halogenated organic compounds react with the colored addition compounds in various ways, depending upon the nature of the organic halogen compound used. Some organic halogen compounds react to split off alkali metal halide and form the corresponding derivatives of the polycyclic hydrocarbons. Others undergo the Wurtz-Fittig reaction to form the doubled molecule. Certain poly-halogenated compounds, for example, dichlormethane, react to form terpene-like compounds while others are simply dehalogenated to form unsaturated compounds. When the halogenated organic compound contains functional groups other than the halogen atoms, these functional groups, for example, carbonyl carboxy, amino, mercapto and the like also may enter into the reaction, together with the polycyclic hydrocarbon used, to form polymeric materials of high molecular weight which are of resinous nature. Similarly, resins are formed with some dihalogenated compounds where the halogen atoms are on widely separated carbon atoms which tend to link up molecules of the polycyclic hydrocarbons into groups of high molecular weight, the resulting substance having a resinous nature usually solid.

The colored alkali metal addition compounds used to react with organic halides in accordance with the present invention may be obtained by the addition of an alkali metal to aromatic polycyclic hydrocarbons such as naphthalene, diphenyl, anthracene, acenaphthene, retene and the like, including their homologues. The preferred method of producing these reactive and soluble alkali metal derivatives was first described by N. D. Scott in U. S. Patent 2,027,000 and a continuation of this patent, U. S. Patent 2,019,832. Certain classes of ether solvents were found to have a very specific action in promoting the reaction of alkali metals with aromatic hydrocarbons to form these intermediate addition products which according to the present invention must be used in the dissolved state in the ether solvents in which they have been prepared. Ethers which have been found useful in preparing these alkali metal addition products include all polyethers and all mono ethers containing a $CH_3$—O— group and in which the ratio of the number of oxygen atoms to the number of carbon atoms is not less than 1:4 and whose structures are stable in contact with the alkali metal and its aromatic hydrocarbon addition complex in question.

By "stable" ethers we do not mean that the ethers may not react in some reversible reaction with the alkali metal and/or aromatic hydrocarbon since indications are that the ethers in effecting the reactions may to some extent take part in the reaction, but the ether must not be broken up or form irreversible reaction products. Thus, for example, ethylene oxide may be considered a cyclic ether falling within the limitations given for the oxygen carbon ratio; however, it reacts, for instance, with sodium naphthalene and hence cannot satisfactorily perform the function required. There may be a very slow ether cleavage with some of the good solvents, but at a rate much slower than that of the desired reaction. In order to simplify the wording later, we further specify such ethers as are "effective" within our invention as being "stable" although as noted they may play some reactive role in causing the reactions to proceed.

Inert non-ether types of solvents, such as hydrocarbons or alkyl sulfides which do not react with the alkali metals and which in themselves are non-effective for the reactions, may be used as diluting agents for the effective ethers. There is, however, a minimum concentration for the effective ether in the non-effective solvents beyond which the reaction will not proceed. Thus, in general, the effective ether can be diluted with a non-reactive, non-effective hydrocarbon or ether up to four or five times its volume. If the dilution be as high as six to ten times the volume of the effective ether, the reaction to form the alkali metal addition product will not proceed.

By the use of these effective ethers alkali metals have been shown to add to aromatic hydrocarbons and certain hydroaromatic hydrocarbons containing more than one benzene nucleus as well as to certain nitrogen containing compounds such as n-methyl carbazol. Aromatic hydrocarbon compounds possessing a reactive methylene group are, of course, excluded from the list of hydrocarbons which will yield these addition compounds. For further description, the invention will be illustrated particularly with rerespect to the reaction of naphthalene with sodium, but it is to be understood that what is said thereon will apply equally well to the reaction of other alkali metals and to any of the suitable naphthalene homologs and analogues and to other condensed ring systems which will allow these intermediates to form.

Effective ethers which fall within the specifications set forth above include dimethyl ether, methyl ethyl ether, ethylene glycol dimethyl ether, ethylene glycol methyl ethyl ether, ethylene glycol methyl, butyl ether, ethylene glycol diethyl ether, ethylene glycol formal, glycerol formal methyl ether, and simple tri ethers of glycerol, tertiary amines and many others with similar properties which will function as solvents for the alkali metal intermediates and also mixtures of these ethers with non-effective solvents up to the concentration at which the effective ether ceases to exert its activating effect.

It is highly important that these effective ethers be essentially free from more than traces of hydroxyl or other impurities, which react with sodium to give especially those which yield insoluble compounds and which tend to "coat over" the surface of the metal, in order to get the addition reaction to start. The sodium should itself be clean and have been preserved under some inert solvent prior to use. The form of the sodium is immaterial, but cubes of the metal one fourth inch on an edge have been found quite satisfactory. Generally, even with the best of care in preparing the solvents, naphthalene and sodium, it is necessary to scratch the surfaces of these sodium cubes to initiate the formation of the green colored (in the case of naphthalene) sodium addition complex. A mechanical stirrer with sufficient speed to cause the sodium cubes to rub over each other lightly under the surface of a solution of naphthalene in one of the effective ethers will in a short time remove this thin protective film from the metallic surfaces and allow the reaction to proceed with great rapidity.

The effective ether solution of naphthalene will readily dissolve sodium in an amount equivalent to one gram atom of sodium for each gram molecule of naphthalene; thereafter the solution of further amounts of sodium becomes so slow as to be negligible. This is somewhat unexpected since the reaction products obtained by further treatment of the green sodium naphthalene complex, for example, with water or carbon dioxide, indicates that it is in large part the 1,4 disodium naphthalene:

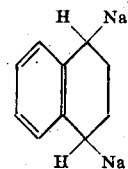

It is probable that this is an equilibrium reaction. It is also found that ether isomeric disodium addition compounds are formed as evidenced by the formation of isomeric acids upon treatment with carbon dioxide.

In view of the fact that the solution which is thus prepared, and contains one gram atom of sodium for each gram molecule of naphthalene, is a highly colored green solution and readily conducts the electric current, it is possible that the addition compound may exist in solution as a free radical which may be represented by the formula:

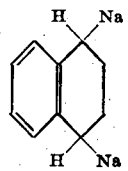

The soluble addition compound may involve the combination of disodium naphthalene with an extra molecule of naphthalene in some other manner. Its formula could be written:

without specifying the exact method of combination. Moreover, this soluble addition product may conceivably also include some combination with the ether solvent to account for the specific action of the effective ethers. The reactions of these alkali metal addition products, however, are clearly evident and their use as intermediates is in no way limited by any hypothesis as to the probable structure in solution.

If such a solution which contains sodium equivalent to one gram atom of sodium for each gram molecule of naphthalene be treated with water or alcohol, it will yield equivalent amounts of naphthalene and dihydronaphthalene; with $CO_2$, it will yield the sodium salts of dihydronaphthalene dicarboxylic acids along with an equivalent amount of naphthalene. If, however, either the hydrolysis or the carboxylation is carried out gradually while further amounts of sodium are present in the liquid, further amounts of this sodium will dissolve as that in solution is used by the hydrolysis or carboxylation. In this manner, it is possible to react essentially all of the naphthalene and recover the major amount of dihydronaphthalene or dihydronaphthalene dicarboxylic acids.

The present invention is not restricted to the use of the above described ethers as solvents for the reaction between the polycyclic aromatic hydrocarbons and alkali metals. For example, certain amino compounds are also effective as solvents for promoting these alkali metal addition reactions. These amino compounds, which are described in co-pending applications filed by J. F. Walker and N. D. Scott, include the amines; trimethylamine, dimethyl ethylamine, and tetramethyl ethylene diamine and a variety of amino ethers having tertiary amino groups, such as dimethylamino dimethyl ether, dimethylaminoethyl methyl ether, diethylaminoethyl methyl ether, dimethylaminoethyl diether of ethylene glycol and diethylamino dioxan.

In one method of practicing our invention we first prepare the colored solution of alkali metal addition compound as described above, for example the sodium addition compound of naphthalene and add to the colored solution the desired organic halogen compound either alone or dissolved in a suitable solvent. The reaction occurs readily with some evolution of heat and it is unnecessary to add any substantial excess of the halogen compound. In general, these reactions occur best at low temperatures and ordinarily we prefer to maintain a reaction temperature of about 0 to 10° C. However, satisfactory results often may be obtained by reacting at room temperature or at higher temperatures, up to the boiling point of the reaction mixture. Another method, and one which in most cases gives the best results, consists in starting the reaction between the alkali metal and the polycyclic aromatic hydrocarbon and then while this reaction is occurring, running in the halogen compound at such rate that the colored compound is reacted with the halogen compound practically as fast as it is formed. In the preferred method of operating by this method the rate of addition of the halogen compound is adjusted so that a small amount of the colored addition compound is present at all times. For example, we may add relatively large pieces of sodium to a solution of naphthalene in dimethyl glycol ether and as soon as the green color of the sodium naphthalene compound occurs, start to add a halogen compound, for example, a solution of methylene chloride in dimethyl glycol ether. The methylene chloride solution is added preferably at such rate that there is a green color surrounding each particle of sodium but the bulk of the reaction mixture is maintained substantially colorless. In these reactions it is obviously advantageous to stir the reaction mixture and we prefer to employ efficient agitation throughout the reaction.

After the reaction has been completed, the reaction product may readily be recovered from the reaction mixture by known means of distillation and purified by crystallization, the alkali metal halide formed being filtered off or removed by washing with water. In most cases the constituents of the reaction mixture may be separated efficiently by first filtering off the alkali metal halide, followed by distillation. The distillation may be carried out first at atmospheric pressure to remove the more volatile materials and the materials of high molecular weight then separated by distillation under reduced pressure. Various suitable distillation procedures, which would depend, of course, upon the nature of the materials present, will be obvious to a skilled chemist.

We have found that alkyl halides, i. e. the homologous series of compounds: methyl chloride, ethyl chloride, propyl chloride, etc., react with the alkali metal addition compounds of the polycyclic aromatic hydrocarbons, for example the sodium addition compound of naphthalene, to form dialkyl derivatives of dihydrogenated polycyclic aromatic hydrocarbons. For example, an alkyl chloride will react with a sodium naphthalene addition compound to form the dialkyl dihydronaphthalene as illustrated by the following equation:

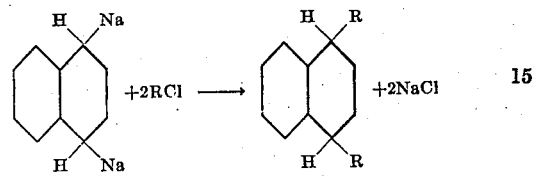

By this method, for example, methyl chloride will form dimethyl dihydronaphthalene; ethyl chloride will form diethyl dihydronaphthalene; and lauryl chloride will form dilauryl dihydronaphthalene. In these compounds, the alkyl groups have been added to the naphthalene molecule and we believe that two isomers may be formed, namely, the 1,2-dialkyl-1,2-dihydronaphthalene and the 1,4-dialkyl-1,4-dihydronaphthalene. In those reactions there is a tendency for the Wurtz-Fittig reaction also to occur, which appears to increase with the molecular weight of the alkyl halide.

The dialkyl dihydro compounds thus prepared may be dehydrogenated to form the corresponding dialkyl derivatives of the original polycyclic aromatic hydrocarbons. For example, the 1,4-dimethyl-1,4-dihydronaphthalene thus may be converted to 1,4-dimethyl naphthalene. The dehydrogenation may be carried out, for example, by halogenating the compound and then heating the halogenated product or treating it with a base to split off hydrohalic acid, e. g. hydrochloric acid. For example, we have converted dimethyl dihydronaphthalene to dimethyl naphthalene by first brominating the compound and then heating to split off hydrobromic acid. Both the hydrogenated and dehydrogenated dialkyl compounds of this type appear to be effective products for a variety of uses. They may be used, for example, as special lubricants or components of lubricant mixtures, especially when the alkyl groups are of relatively high molecular weight. They serve as valuable intermediates for the synthesis of a variety of useful organic compounds.

We have also found that cyclic aliphatic monohalides, for example, cyclohexyl chloride, react in the same manner as the alkyl halides. For example, dicyclohexyl dihydronaphthalene may be formed in this manner and this compound may be dehydrogenated to form dicyclohexyl dihydronaphthalene.

Aralkyl halides generally do not react like the alkyl halides but when brought in contact with the alkali metal addition compounds of polycyclic aromatic hydrocarbons they undergo the Wurtz-Fittig reaction to form corresponding doubled molecules. For example, benzyl chlorite, when reacted with the sodium naphthalene addition compound forms dibenzyl in good yield. This has been found to be an especially advantageous method of making dibenzyl. This method further may be used advantageously for making various substituted compounds of dibenzyl and the like by starting with the substituted benzyl halide. For example, decachlor dibenzyl may be prepared by reacting the colored sodium addition compound with pentachlor benzyl chloride. The chlorine atom on the methylene group of the pentachlor benzyl chloride is so much more reactive than the chlorine atoms on the aromatic portion of the molecule that the latter chlorine atoms do not enter into the reaction to any substantial extent.

Olefine dichlorides of the homologous series, methylene chloride (dichlormethane), ethylene dichloride, sym. propylene dichloride, and the like, in which the chloride atoms are joined to the end carbon atoms, react in different ways depending upon the particular compound. When a dihalogenated aliphatic compound having either both halogen atoms on the same carbon atom or the halogen atoms in the 1,3 positions is used as reagent, terpene-like compounds are usually formed. For example, dichlormethane and 1,3-dichlorpropane react with the sodium-naphthalene addition compound to form terpene-like compounds, namely methylene naphthalene and trimethylene naphthalene respectively. On the other hand, aliphatic compounds having halogen atoms on adjacent carbon atoms are dehalogenated. For example, ethylene dichloride (1,2 dichlorethane) is dehalogenated by the reaction with this addition compound to form ethylene, naphthalene and sodium chloride. Still other dichlorinated compounds may react to form polymeric resinous materials. For example, symmetrical dichlordipropyl ether reacts with the sodium naphthalene addition compound to form a solid resinous polymer which apparently has the following structure:—

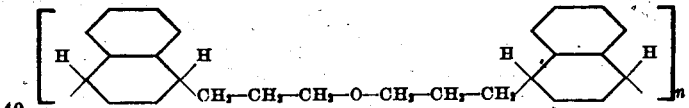

In addition to the halogenated compounds mentioned above by way of example, the various other halogenated organic compounds may be reacted in accordance with the present invention. Such halogenated compounds may be halogenated ethers or esters; halogenated aliphatic or aromatic acids, e. g. chlor benzoic acid or chloracetic acid; halogenated aromatic hydrocarbons; halogenated phenols; halogenated aromatic or aliphatic ketones; halogenated amides; halogenated amines; halogenated nitriles, acyl halides, e. g. acetyl chloride, benzoyl chloride, phthalyl dichloride; halogenated organic sulfides, e. g. dichlordiethyl sulfide. Ordinarily, with compounds containing a carbonyl group, resinous materials will be formed. With compounds containing hydrogen atoms which tend to react with alkali metals such as amino compounds, mercaptans, alcohols, acids and some ketones, part of the alkali metal in the colored addition compound will react to replace the replaceable hydrogen.

Saturated compounds, including unsaturated hydrocarbons which have double bonds usually are polymerized when contacted with the colored alkali metal addition compounds. If halogenated derivatives of such unsaturated compounds are reacted according to the present invention, in addition to the reaction between the halogen atoms and the sodium addition compound, the polymerization of the unsaturated molecules usually also will occur, giving rise to high molecular weight resin products having useful properties. For example, chloroprene reacts with sodium naphthalene addition compound to produce a high molecular weight polymer which is a rubber-like gummy material, substantially free from combined chlorine.

Our invention is not restricted to the reaction of chlorinated compounds but organic bromides and iodides may likewise be used satisfactorily. For most purposes we prefer to make the sodium addition compound of naphthalene and react this with a chlorinated organic compound because sodium, naphthalene and chlorine are the cheapest members of their respective groups. However, we may in some cases substitute various other polycyclic aromatic hydrocarbons in place of the naphthalene to obtain modifications of the product in those reactions where the polycyclic aromatic hydrocarbon molecule forms part of the molecule of the final product.

We claim as

1. The process comprising reacting together an organic halide with a solution of the alkali metal addition compound of a polycyclic aromatic hydrocarbon.

2. The process comprising reacting together a halogenated hydrocarbon with a solution of the alkali metal addition compound of a polycyclic aromatic hydrocarbon.

3. The process comprising reacting together an aliphatic halide with a solution of the alkali metal addition compound of a polycyclic aromatic hydrocarbon.

4. The process comprising reacting together an alkyl halide with a solution of the alkali metal addition compound of a polycyclic aromatic hydrocarbon.

5. The process comprising reacting together an alkyl halide with a solution of the sodium addition compound of a polycyclic aromatic hydrocarbon.

6. The process comprising reacting together an alkyl halide with a solution of the sodium addition compound of naphthalene.

7. The process comprising reacting together an aralkyl halide having at least one halogen atom joined to a non-aromatic carbon atom with a solution of the alkali metal addition compound of a polycyclic aromatic hydrocarbon.

8. The process comprising reacting together a benzyl halide with a solution of the alkali metal addition compound of a polycyclic aromatic hydrocarbon.

9. The process comprising reacting together a benzyl halide with a solution of the sodium addition compound of naphthalene.

10. The process comprising reacting together pentachlorobenzyl chloride with a solution of the sodium addition compound of naphthalene.

11. The process comprising reacting together a dihalomethane with a solution of the alkali metal addition compound of a polycyclic aromatic hydrocarbon.

12. The process comprising reacting together a dihalomethane with a solution of the sodium addition compound of naphthalene.

13. The process comprising reacting together a 1,3-dihalopropane with a solution of the alkali metal addition compound of a polycyclic aromatic hydrocarbon.

14. The process comprising reacting together a 1,3-dihalopropane with a solution of the sodium addition compound of naphthalene.

NORMAN D. SCOTT.
JOSEPH FREDERIC WALKER.

CERTIFICATE OF CORRECTION.

Patent No. 2,150,039. March 7, 1939.

NORMAN D. SCOTT, ET AL.

It is hereby certified that error appears in the printed specification of the above numbered patent requiring correction as follows: Page 2, second column, line 42, in the formula, strike out the expression "Na"; and that the said Letters Patent should be read with this correction therein that the same may conform to the record of the case in the Patent Office.

Signed and sealed this 18th day of April, A. D. 1939.

Henry Van Arsdale (Seal) Acting Commissioner of Patents.